US012404659B2

(12) United States Patent
Hamakawa et al.

(10) Patent No.: US 12,404,659 B2
(45) Date of Patent: Sep. 2, 2025

(54) MEASURING APPARATUS, MEASURING METHOD AND RECORDING MEDIUM

(71) Applicant: JAPAN AVIATION ELECTRONICS INDUSTRY, LIMITED, Tokyo (JP)

(72) Inventors: Keita Hamakawa, Tokyo (JP); Yusuke Inoue, Tokyo (JP); Hiroyuki Takahashi, Tokyo (JP); Takazumi Yamada, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 982 days.

(21) Appl. No.: 17/392,623

(22) Filed: Aug. 3, 2021

(65) Prior Publication Data
US 2022/0170245 A1 Jun. 2, 2022

(30) Foreign Application Priority Data
Nov. 27, 2020 (JP) ................................. 2020-196616

(51) Int. Cl.
*E02F 9/26* (2006.01)
*E21B 47/024* (2006.01)
(Continued)

(52) U.S. Cl.
CPC ............ *E02F 9/264* (2013.01); *E21B 47/024* (2013.01); *G01C 9/06* (2013.01); *G01C 25/00* (2013.01); *G01P 15/18* (2013.01)

(58) Field of Classification Search
CPC .......... E02F 9/264; E21B 47/024; G01C 9/06; G01C 25/00; G01P 15/18; G01V 3/081; G01D 21/02
See application file for complete search history.

(56) References Cited

U.S. PATENT DOCUMENTS 5,432,699 A * 7/1995 Hache .................. E21B 47/022
702/9
5,564,193 A * 10/1996 Brooks ..................... G01V 3/26
33/304
(Continued)

FOREIGN PATENT DOCUMENTS

EP 1184539 A2 3/2002
WO WO-2006047523 A1 * 5/2006 ........... E21B 47/022

OTHER PUBLICATIONS

Angus Jamieson, "Introduction to Wellbore Positioning", University of the Highland and Islands, 2012, Sect5(p. 31), Sect22(p. 125) available online full text https://www.westpaq.com/wp-content/uploads/2013/04/Introduction-to-Wellbore-Positioning.pdf (Year: 2012).*

(Continued)

*Primary Examiner* — Lisa M Caputo
*Assistant Examiner* — Toni D Sauncy
(74) *Attorney, Agent, or Firm* — Greenblum & Bernstein, P.L.C.

(57) ABSTRACT

The attitude of an excavating part during excavation is accurately measured. A measuring apparatus of the present invention executes an attitude estimating processing and a phase correction amount calculating processing. The phase correction amount calculating processing calculates an offset between a gravity tool face and a magnetic force tool face, and sets the calculated offset as an estimated offset. The attitude estimating processing sets the gravity tool face based on the acceleration data as a measured gravity tool face, the magnetic force tool face based on the magnetic field data as a measured magnetic force tool face, a difference between an offset between the measured gravity tool face and the measured magnetic force tool face and the estimated offset as a phase correction amount, and data obtained by correcting the magnetic field data with the phase (Continued)

correction amount as corrected magnetic field data, and determines the attitude based on the acceleration data and the corrected magnetic field data.

21 Claims, 7 Drawing Sheets

(51) Int. Cl.
  *G01C 9/06* (2006.01)
  *G01C 25/00* (2006.01)
  *G01P 15/18* (2013.01)
  *G01V 8/00* (2006.01)

(56) References Cited

U.S. PATENT DOCUMENTS

| | | | | |
|---|---|---|---|---|
| 8,095,317 | B2* | 1/2012 | Ekseth | E21B 47/022 |
| | | | | 702/7 |
| 8,280,638 | B2* | 10/2012 | Brooks | G01V 11/00 |
| | | | | 702/9 |
| 9,464,482 | B1 | 10/2016 | Bargach et al. | |
| 10,094,850 | B2* | 10/2018 | Brooks | E21B 7/06 |
| 2006/0260843 | A1* | 11/2006 | Cobern | E21B 47/024 |
| | | | | 175/45 |
| 2007/0203651 | A1* | 8/2007 | Blanz | E21B 47/024 |
| | | | | 702/6 |
| 2010/0295703 | A1* | 11/2010 | Weston | E21B 19/00 |
| | | | | 340/856.3 |
| 2013/0151157 | A1* | 6/2013 | Brooks | E21B 47/022 |
| | | | | 702/9 |
| 2013/0151158 | A1* | 6/2013 | Brooks | E21B 47/022 |
| | | | | 702/92 |
| 2014/0367170 | A1* | 12/2014 | Hoehn | E21B 47/02 |
| | | | | 175/45 |
| 2015/0218887 | A1* | 8/2015 | Bayliss | E21B 44/005 |
| | | | | 175/24 |
| 2015/0378043 | A1* | 12/2015 | Brooks | E21B 7/06 |
| | | | | 702/9 |
| 2016/0130878 | A1* | 5/2016 | Cobern | E21B 47/024 |
| | | | | 175/45 |
| 2016/0201449 | A1* | 7/2016 | Dirksen | E21B 7/10 |
| | | | | 702/9 |
| 2017/0175517 | A1* | 6/2017 | Ledroz | G01C 19/02 |
| 2019/0195063 | A1* | 6/2019 | Weston | E21B 47/022 |
| 2019/0353023 | A1* | 11/2019 | Whitacre | G01V 3/38 |
| 2022/0251938 | A1* | 8/2022 | Whitmore | E21B 7/06 |

OTHER PUBLICATIONS

"Extracting three component magnetic data from down hole surveys or Survey for nothing and your mag for free (with apologies to Dire Straits)" Kim Francombe, Explore Geo, Feature Paper Preview, Magazine of the Australian Society of Exploration Geophysicists, 2015(177)pp. 38-41 Aug. 2015. (Year: 2015).*

"A new measurement-while-drilling system based on inertial technology", Song, et.al., Advances in Mechanical Engineering 2018 vol. 10(3) pp. 1-14; DOI: 10.1177/1687814018767498 journals.sagepub.com/home/ade (Year: 2018).*

Brooks, et al, "Practical Application of a Multiple-Survey Magnetic Correction Algorithm", SPE 49060, 1998. (Year: 1998).*

Extended European Search Report issued in corresponding European Application No. 21189658, dated Feb. 2, 2022.

Ando et al., "Metal Enclosed Bus and Its Analysis ", Hitachi Review , Jun. 1957, vol. 39, No. 6, pp. 11-16, with partial English translation.

* cited by examiner

MEASURING APPARATUS, MEASURING METHOD AND RECORDING MEDIUM

TECHNICAL FIELD

The present invention relates to a measuring apparatus, a measuring method, and a recording medium for determining the attitude of an excavating part of an underground excavator by using outputs from an acceleration sensor and a magnetic sensor which are arranged in the excavating part of the underground excavator.

BACKGROUND ART

A technique disclosed in US 2019/0353023 A1 (hereinafter referred to as "Patent Literature 1") is known as a prior art. Patent Literature 1 shows that two sensor sets are used to calibrate or correct measurement data. FIG. 1 is an example of processing of a correction operation shown in FIG. 4 of Patent Literature 1. Note that it is shown by Takuro Ando and Tsuneyoshi Takasuna in "Metal Enclosed Bus and Its Analysis", Hitachi Review, Vol. 39, No. 6, pp 11-16 in June 1957 (hereinafter referred to as "Non-Patent Literature 1") that an eddy current occurs in a conductor which shields an alternating magnetic field. Further, it is also pointed out in Patent Literature 1 that an eddy current occurs in a conductor present in an excavating part due to an influence of geomagnetism during excavation.

SUMMARY OF THE INVENTION

Patent Literature 1 introduces various techniques for cases where data of sensor sets are deteriorated. However, Patent Literature 1 does not clearly present a method for accurately measuring the attitude of the excavating part during excavation. In recent years, in order to improve efficiency, it has been required to measure the attitude even during excavation, but it is problematic that the measurement during excavation has a large error. The present invention has an object to provide a technique for accurately measuring the attitude of an excavating part during excavation.

A measuring apparatus according to the present invention determines an attitude by using acceleration data output from an acceleration sensor having at least three axes and magnetic field data output from a magnetic sensor having at least three axes, the acceleration sensor and the magnetic sensor being arranged in an excavating part of an underground excavator. The measuring apparatus according to the present invention comprises a processing circuitry. The processing circuitry executes an attitude estimating processing and a phase correction amount calculating processing. The attitude estimating processing determines the attitude of the excavating part based on the acceleration data and the magnetic field data. The phase correction amount calculating processing calculates an offset between a gravity tool face and a magnetic force tool face, and sets the calculated offset as an estimated offset. More specifically, the attitude estimating processing sets the gravity tool face based on the acceleration data as a measured gravity tool face, the magnetic force tool face based on the magnetic field data as a measured magnetic force tool face, a difference between an offset between the measured gravity tool face and the measured magnetic force tool face and the estimated offset as a phase correction amount, and data obtained by correcting the magnetic field data with the phase correction amount as corrected magnetic field data, and determines the attitude based on the acceleration data and the corrected magnetic field data.

Effect of the Invention

According to the measuring apparatus of the present invention, a phase correction amount is calculated so as to cope with the change in phase of the magnetic field caused by the influence of an eddy current occurring in the metal housing covering the excavating part during excavation, etc., and the attitude is determined by using the phase correction amount, so that the attitude of the excavating part can be accurately measured even during excavation.

DETAILED DESCRIPTION OF THE EMBODIMENTS

Figure 1:
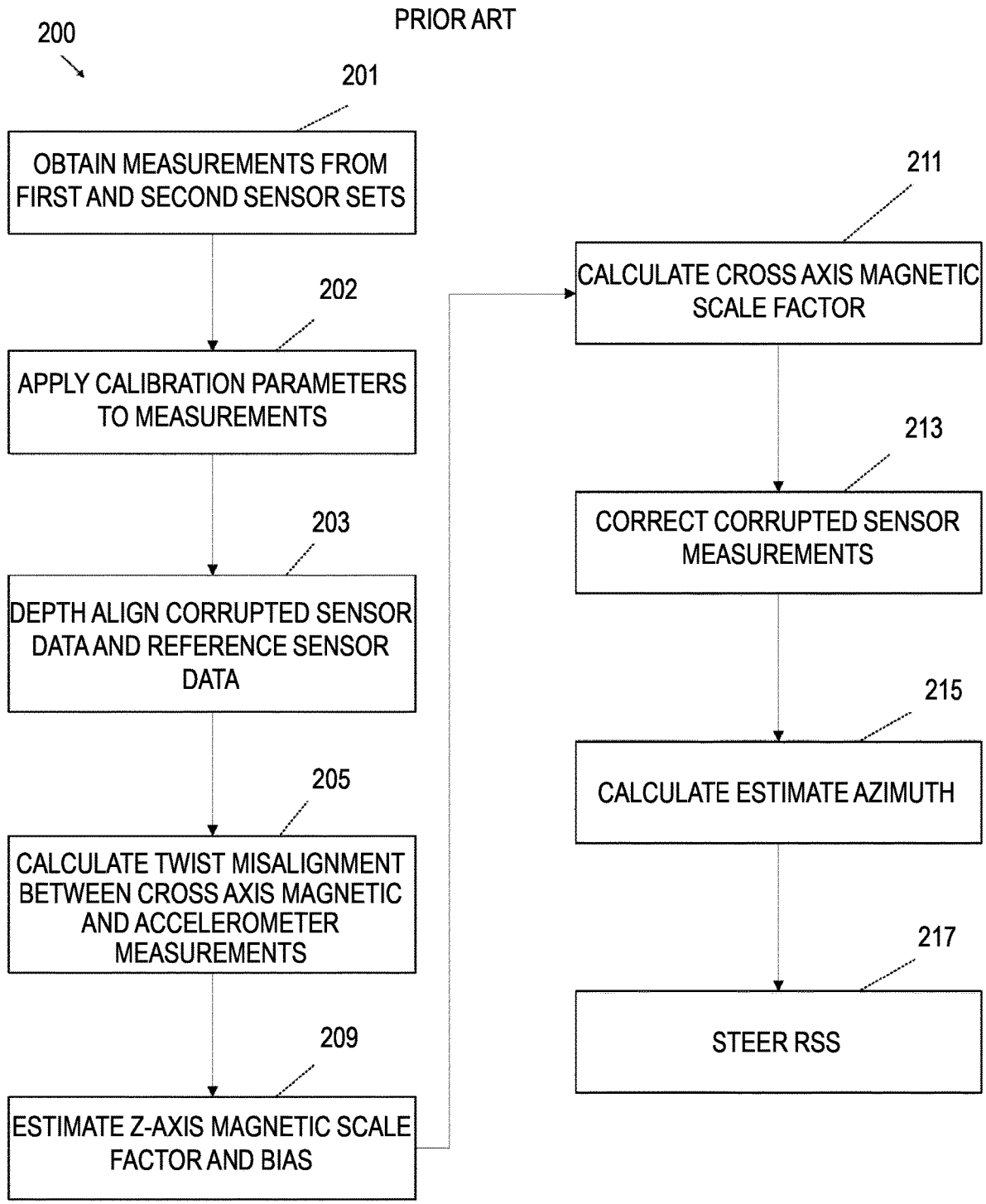
FIG. 1 is a diagram showing an example of processing of a correction operation of a prior art.

Hereinafter, embodiments of the present invention will be described in detail. The components having the same functions are represented by the same reference numerals, and duplicate description thereof will be omitted.

First Embodiment

<Analysis>

A measuring apparatus which is a target of the present invention determines the attitude of an excavating part of an underground excavator by using acceleration data ($A_x$, $A_y$, $A_z$) and magnetic field data ($M_x$, $M_y$, $M_z$) which are output from a triaxial acceleration sensor and a triaxial magnetic sensor arranged in the excavating part of the underground excavator. $A_z$ is an acceleration component in an excavation direction. $A_x$ and $A_y$ are acceleration components perpendicular to the excavation direction, and are orthogonal to each other. $M_z$ is a magnetic force component in the excavation direction. $M_x$ and $M_y$ are magnetic force components perpendicular to the excavation direction, and are orthogonal to each other. Therefore, the acceleration data ($A_x$, $A_y$, $A_z$) and the magnetic field data ($M_x$, $M_y$, $M_z$) which are output from the triaxial acceleration sensor and the triaxial magnetic sensor arranged in the excavating part of the actual underground excavator respectively were used to determine an inclination angle and an azimuth angle both at rest and during rotation. Although there is no figure showing a result, there is no change in the measured value of the inclination angle depending on whether the excavating part is stationary or rotating. On the other hand, with respect to the azimuth angle, there was obtained a result that the measured value of the azimuth angle changed from the measured value at rest when it started to rotate. That is, it can be estimated that an error will occur in the azimuth angle due to rotation of the excavating part.

Figure 2:
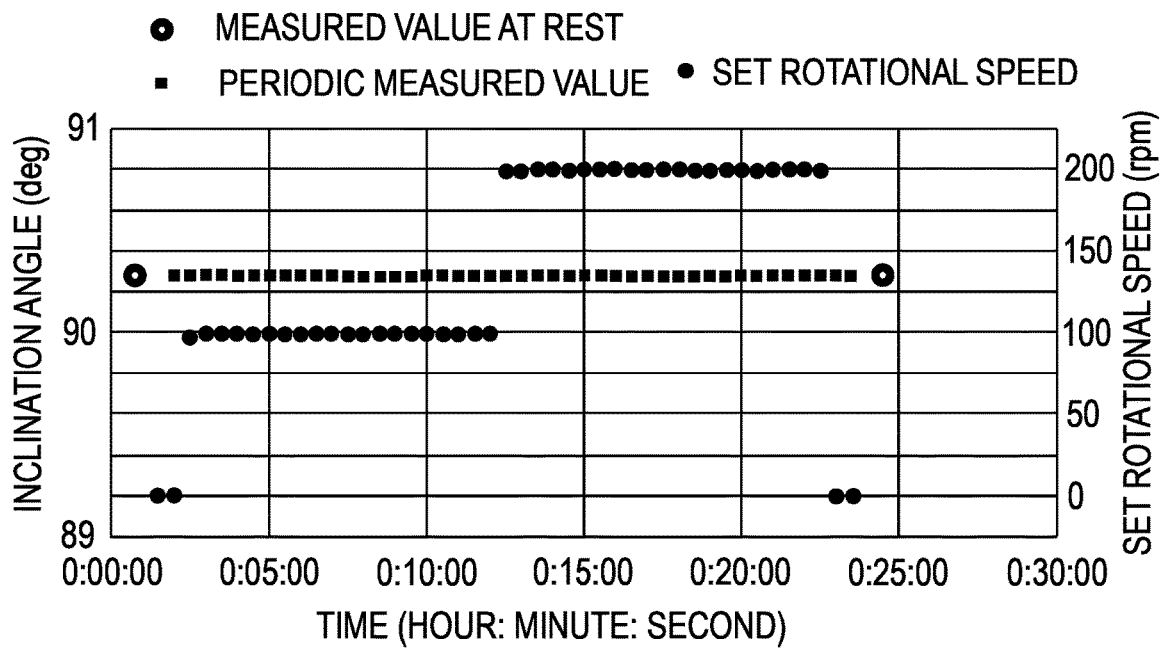
FIG. 2 is a diagram showing an inclination angle determined by using acceleration data and magnetic field data which are respectively output from a triaxial acceleration sensor and a triaxial magnetic sensor arranged in an excavating part having no metal housing in a state where the attitude of the excavating part is fixed while the rotational speed of the excavating part is controlled.
Figure 3:
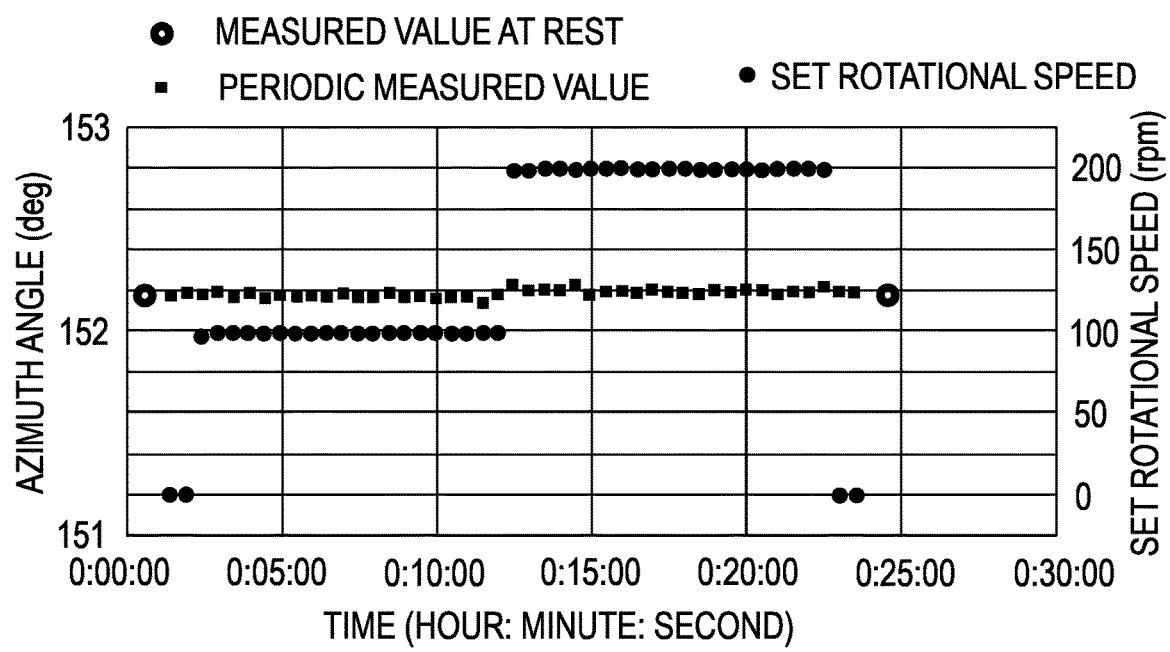
FIG. 3 is a diagram showing an azimuth angle determined by using the acceleration data and the magnetic field data which are respectively output from the triaxial acceleration sensor and the triaxial magnetic sensor arranged in the excavating part having no metal housing in a state where the attitude of the excavating part is fixed while the rotational speed of the excavating part is controlled.
Figure 4:
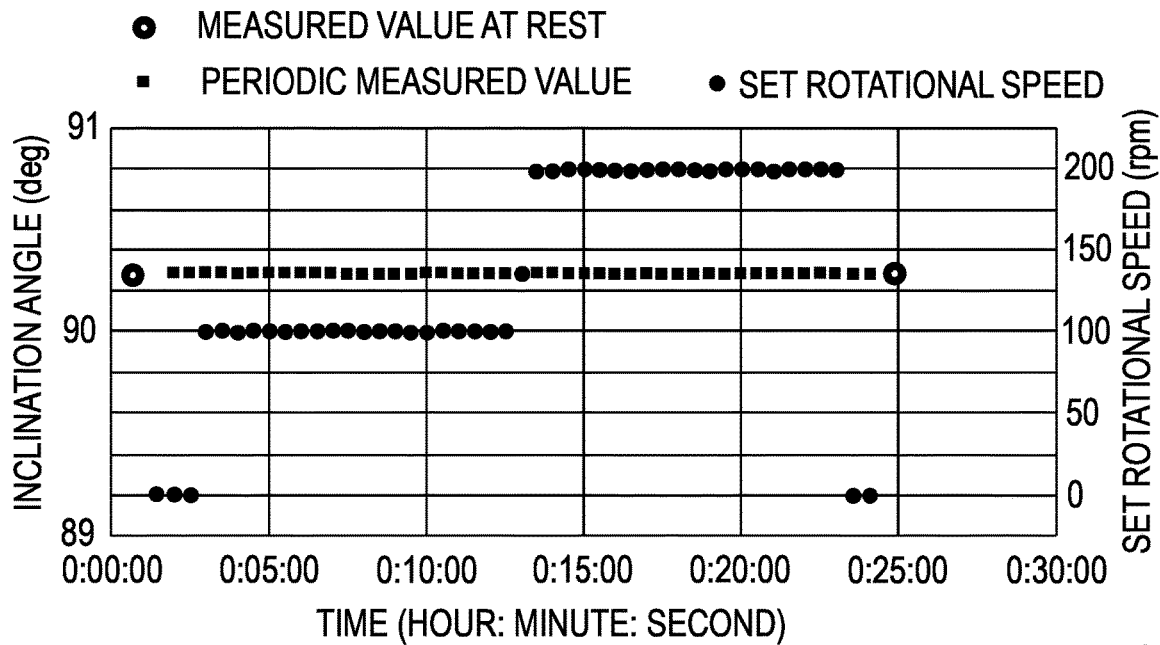
FIG. 4 is a diagram showing an inclination angle determined by using acceleration data and magnetic field data which are respectively output from a triaxial acceleration sensor and a triaxial magnetic sensor arranged in a metal housing of an excavating part having the metal housing in a state where the attitude of the excavating part is fixed while the rotational speed of the excavating part is controlled.
Figure 5:
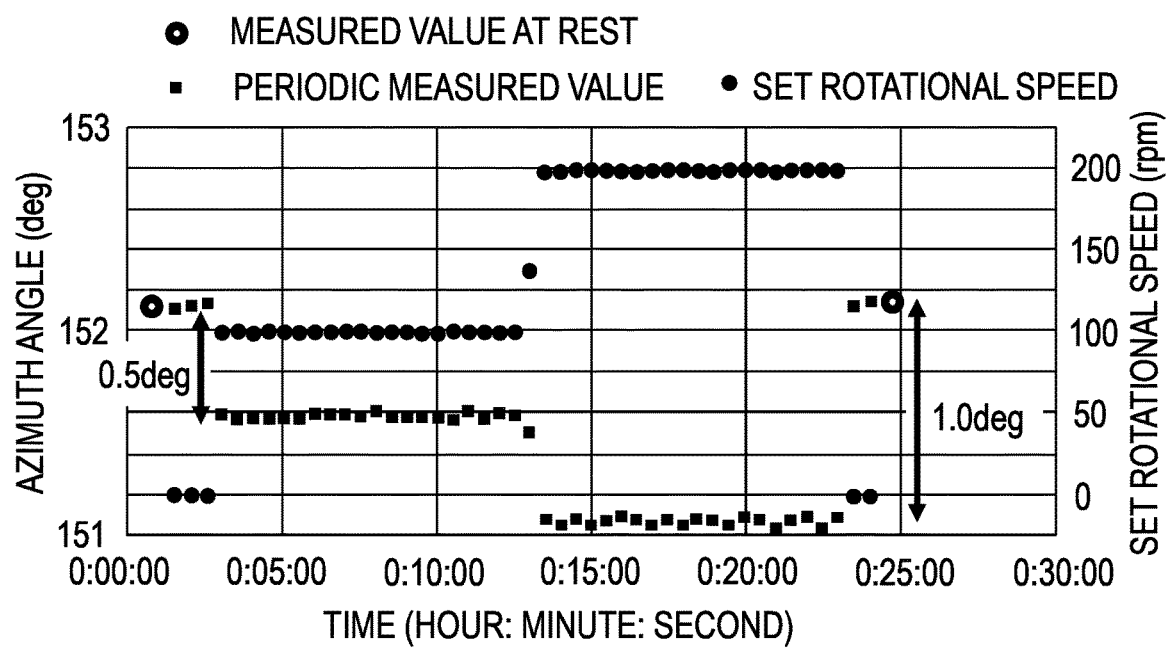
FIG. 5 is a diagram showing an azimuth angle determined by using the acceleration data and the magnetic field data which are respectively output from the triaxial acceleration sensor and the triaxial magnetic sensor arranged in the metal housing of the excavating part having the metal housing in a state where the attitude of the excavating part is fixed while the rotational speed of the excavating part is controlled.

Next, a result of an experiment conducted to confirm estimation is shown. FIGS. 2 and 3 show an inclination angle and an azimuth angle determined by using acceleration data ($A_x$, $A_y$, $A_z$) and magnetic field data ($M_x$, $M_y$, $M_z$) which are respectively output from a triaxial acceleration sensor and a triaxial magnetic sensor arranged in an excavating part having no metal housing in a state where the attitude of the excavating part is fixed while the rotational speed of the excavating part is controlled. Further, FIGS. 4 and 5 show an inclination angle and an azimuth angle determined by using acceleration data ($A_x$, $A_y$, $A_z$) and magnetic field data ($M_x$, $M_y$, $M_z$) which are respectively output from a triaxial acceleration sensor and a triaxial magnetic sensor arranged in an excavating part having a metal housing in a state where the attitude of the excavating part is fixed while the rotational speed of the excavating part is controlled. The vertical axis on the left side of FIGS. 2 and 4 indicates the inclination angle (deg), and the vertical axis on the left side of FIGS. 3 and 5 indicates the azimuth angle (deg). The vertical axis on the right side of FIGS. 2 to 5 indicates a set rotational speed (rpm) of the excavating part, and the horizontal axis indicates a time for which measurement is performed (hour: minute: second). Hollow circles indicate results (measured values at rest) obtained by using acceleration data ($A_x$, $A_y$, $A_z$) and magnetic field data ($M_x$, $M_y$, $M_z$) when the excavating part is stationary. Squares indicate results obtained periodically and continuously by using the acceleration data ($A_x$, $A_y$, $A_z$) and the magnetic field data ($M_x$, $M_y$, $M_z$). When the excavating part is rotating, the acceleration data ($A_x$, $A_y$, $A_z$) and the magnetic field data ($M_x$, $M_y$, $M_z$) contain various noises caused by vibration and the like. Therefore, the inclination angle and the azimuth angle are included in state quantities of a Kalman filter, and the inclination angle and the azimuth angle are determined by using the Kalman filter with the acceleration data ($A_x$, $A_y$, $A_z$) and the magnetic field data ($M_x$, $M_y$, $M_z$) being set as input data for the Kalman filter.

Here, ($a_x$, $a_y$, $a_z$) represent acceleration data caused by gravity, and it is assumed that $a_z$ represents a gravitational acceleration component in the excavation direction, and $a_x$ and $a_y$ are gravitational acceleration components perpendicular to the excavation direction and are orthogonal to each other. At this time, the inclination angle (Inc) is defined as follows.

$$Inc = \cos^{-1}\left(\frac{a_z}{\sqrt{a_x^2 + a_y^2 + a_z^2}}\right)$$

In other words, the magnetic field data ($M_x$, $M_y$, $M_z$) is not used in the calculation for determining the inclination angle. From the results of FIGS. 2 and 4, it is apparent that the calculation for determining the inclination angle by using only the acceleration data is not affected by the metal housing, and the same inclination angle is estimated for both a case where the excavating part is stationary and a case where the excavating part is rotating. Further, the azimuth angle (Azm) is defined as follows.

$$Azm = \tan^{-1}\left(\frac{(M_x \cdot a_y - M_y \cdot a_x) \cdot \sqrt{a_x^2 + a_y^2 + a_z^2}}{-M_x \cdot a_x \cdot a_z - M_y \cdot a_y \cdot a_z + M_z \cdot (a_x^2 + a_y^2)}\right)$$

Both the acceleration data ($a_x$, $a_y$, $a_z$) and the magnetic field data ($M_x$, $M_y$, $M_z$) are used in the calculation for determining the azimuth angle. From the result of FIG. 3, it is apparent that in the case of the excavating part having no metal housing, substantially the same azimuth angle is determined in both the case where the excavating part is stationary and the case where the excavating part is rotating. In FIG. 5, when the excavating part rotates at 100 rpm, the azimuth angle changes by about 0.5 degrees as compared with the case where the excavating part is stationary, and when the excavating part rotates at 200 rpm, the azimuth angle changes by about 1.0 degree as compared with the case where the excavating part is stationary. From the result of FIG. 5, it is apparent that in the case where the acceleration sensor and the magnetic sensor are arranged in the metal housing, the estimation value is affected by the rotational speed of the excavating part. From the results of FIGS. 2 to 5, it is apparent that the rotation of the metal housing affects the magnetic field data measured by the magnetic sensor arranged in the excavating part.

As described above, Non-Patent Literature 1 shows that an eddy current occurs in a conductor for shielding an alternating magnetic field. In this case, the geomagnetism is constant, but the metal housing rotates. It is considered that this rotation causes an eddy current in the housing as in the case of shielding the alternating magnetic field. Non-Patent Literature 1 shows the relation between a magnetic field strength Hi inside a cylinder and a magnetic field strength $H_0$ in the case of no cylinder as follows, wherein D represents the diameter of the cylinder, d represents the thickness of the cylinder, ρ represents the specific resistance of the metal, f represents the frequency of the magnetic field, $\mu_0$ represents the magnetic permeability of the air, and j represents the imaginary unit.

$$\frac{H_i}{H_o} = \frac{1}{1 + j\left(\frac{\pi\mu_0 fdD}{2\rho}\right)}$$

Since an imaginary part exists in the denominator on the right side, it is apparent that the phase of the magnetic field changes. The excavating part of an actual underground excavator is covered with a metal housing. Therefore, if the azimuth angle is determined by using acceleration data and magnetic field data measured in the rotating excavating part without considering the change in the phase of the magnetic field, much error is contained in the azimuth angle. Therefore, when acceleration data ($A_x$, $A_y$, $A_z$) and magnetic field data ($M_x$, $M_y$, $M_z$) which are output from the triaxial acceleration sensor and the triaxial magnetic sensor arranged in the excavating part of the underground excavator respectively are used to determine the attitude (inclination angle, azimuth angle, dip angle, etc.), it is necessary to consider that the phase of the magnetic field changes when the excavating part is rotating.

Example

Figure 6:
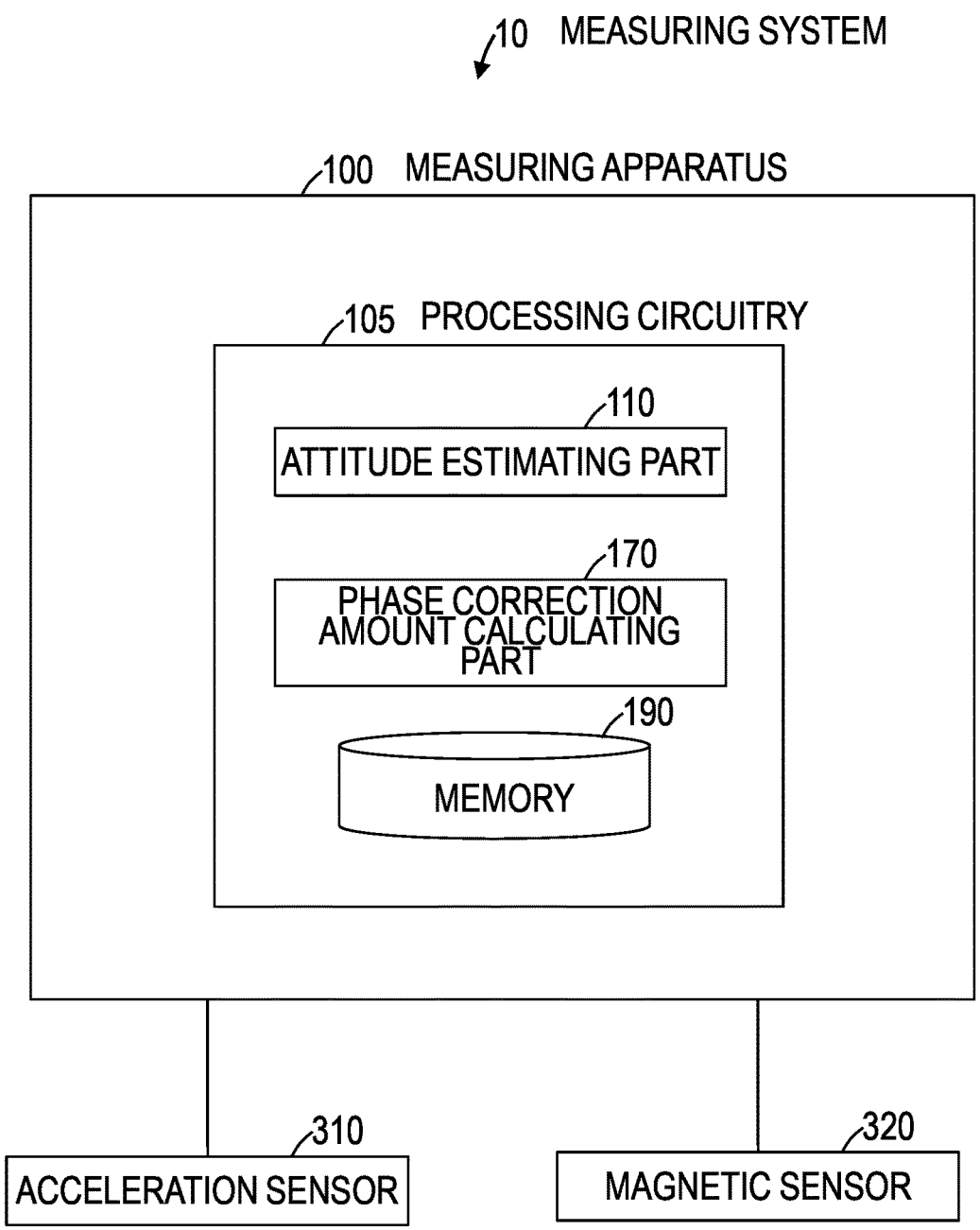
FIG. 6 is a diagram showing an example of a functional configuration of a measuring system of the present invention.
Figure 7:
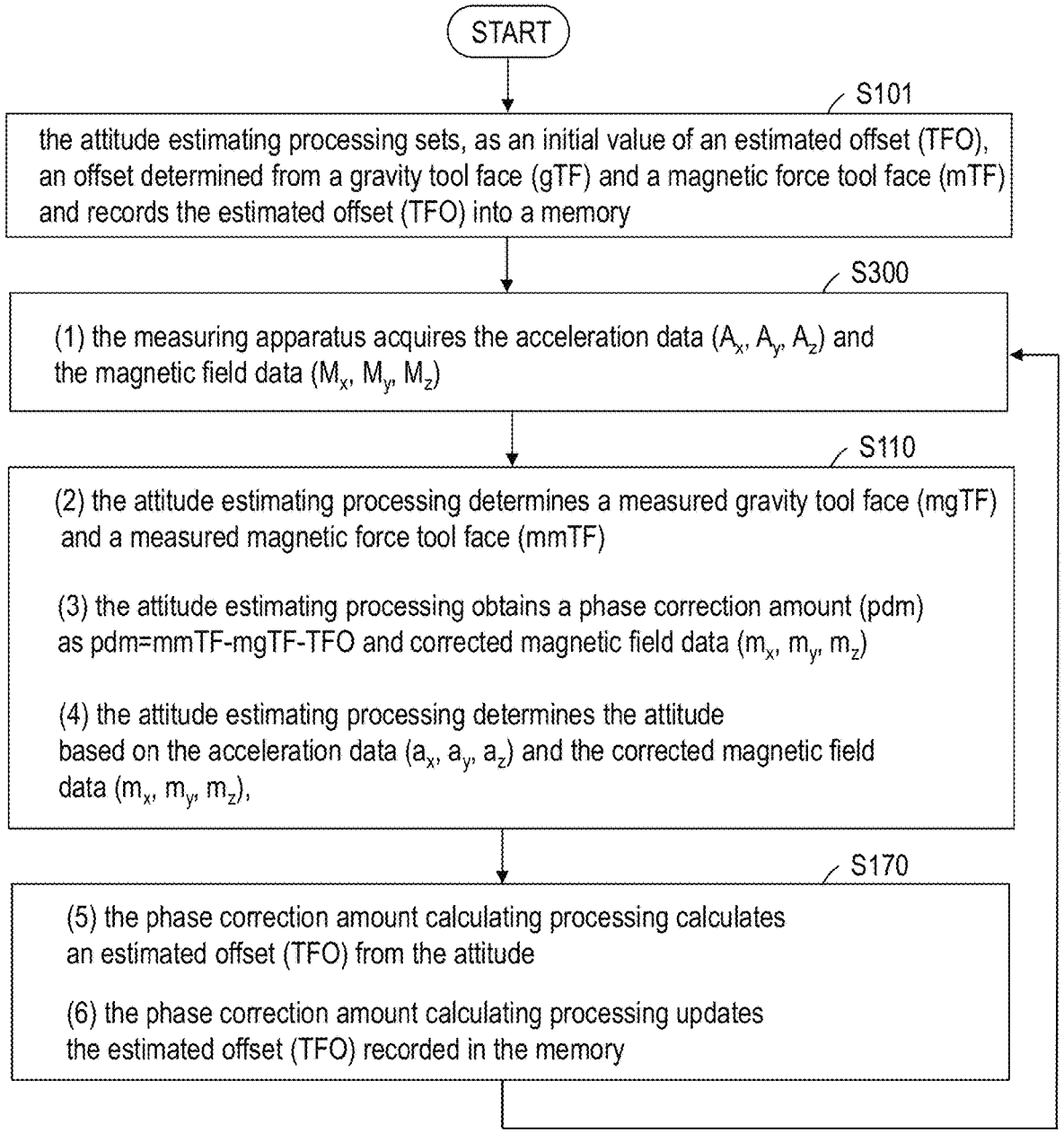
FIG. 7 is a diagram showing an example of a processing flow of a measuring method of the present invention.

FIG. 6 shows an example of the functional configuration of the measuring system of the present invention. FIG. 7 shows an example of the processing flow of the measuring method of the present invention. The measuring system 10 of the present invention comprises a measuring apparatus 100, an acceleration sensor 310 having at least three axes, and a magnetic sensor 320 having at least three axes. The acceleration sensor 310 having at least three axes and the magnetic sensor 320 having at least three axes are arranged in the excavating part of the underground excavator. The excavating part is covered with a metal housing, and the acceleration sensor 310 having at least three axes and the magnetic sensor 320 having at least three axes are housed in the metal housing. Theoretically, if there are data from a triaxial acceleration sensor 310 and a triaxial magnetic sensor 320, the measuring system described below can work. However, for the purpose of improving accuracy or the like, a plurality of acceleration sensors or magnetic sensors may be provided for one axis, or an acceleration sensor and a magnetic sensor each of which has four or five axes or the like may be provided. Therefore, an expression of "having at least three axes" is presented in the foregoing description. Hereinafter, a case where an acceleration sensor 310 having three axes (hereinafter referred to as "triaxial acceleration sensor 310") and a magnetic sensor 320 having three axes (hereinafter referred to as "triaxial magnetic sensor 320" are provided will be described.

The measuring apparatus 100 determines the attitude of the excavating part of the underground excavator by using acceleration data ($A_x$, $A_y$, $A_z$) output from the triaxial acceleration sensor 310 and magnetic field data ($M_x$, $M_y$, $M_z$) output from the triaxial magnetic sensor 320, the acceleration sensor 310 and the triaxial magnetic sensor 320 being arranged in the excavating part of the underground excavator. Note that data directly output from triaxial acceleration sensor 310 and the triaxial magnetic sensor 320 are not used as the acceleration data ($A_x$, $A_y$, $A_z$) and the magnetic field data ($M_x$, $M_y$, $M_z$), but data obtained by processing such as filtering processing and temperature-correction processing on the acceleration data ($A_x$, $A_y$, $A_z$) and the magnetic field data ($M_x$, $M_y$, $M_z$) are used as the acceleration data ($A_x$, $A_y$, $A_z$) and the magnetic field data ($M_x$, $M_y$, $M_z$). The measuring apparatus 100 comprises a processing circuitry 105 that is controlled by a program to process information. The processing circuitry 105 comprises an attitude estimating part 110, a phase correction amount calculating part 170, and a memory 190. The processing circuitry 105 executes an attitude estimating processing by the attitude estimating part 110 and a phase correction amount calculating processing by the phase correction amount calculating part 170. The attitude estimating part 110 determines the attitude of the excavating part based on acceleration data and magnetic field data. The "attitude" includes an inclination angle (Inc), an azimuth angle (Azm), and a dip angle (Dip). Further, $A_z$ represents an acceleration component in an excavation direction. $A_x$ and $A_y$ represent acceleration components perpendicular to the excavation direction and are orthogonal to each other. $M_z$ represents a magnetic force component in the excavation direction. $M_x$ and $M_y$ represent magnetic force components perpendicular to the excavation direction and are orthogonal to each other. Note that when the excavating part is rotating, the acceleration data ($A_x$, $A_y$, $A_z$) and the magnetic field data ($M_x$, $M_y$, $M_z$) include various noises caused by vibration and the like. The attitude estimating part 110 removes noise components by using a prior art such as a Kalman filter, and determines an inclination angle (Inc), an azimuth angle (Azm), a dip angle (Dip), a gravity tool face (gTF), and a magnetic force tool face (mTF) based on gravity-caused acceleration data ($a_x$, $a_y$, $a_z$) and magnetic field data ($M_x$, $M_y$, $M_z$).

The attitude estimating part 110 receives, as input data, acceleration data ($A_x$, $A_y$, $A_z$) and magnetic field data ($M_x$, $M_y$, $M_z$) when the excavating part is stationary, and calculates initial values of an attitude, etc. with the received data (S101). Specifically, initial values of the inclination angle ($Inc_0$), azimuth angle ($Azm_0$), dip angle ($Dip_0$), gravity tool face ($gTF_0$), and magnetic force tool face ($mTF_0$) are determined as follows.

$$Inc_0 = \cos^{-1}\left(\frac{A_z}{\sqrt{A_x^2 + A_y^2 + A_z^2}}\right)$$

$$Azm_0 = \tan^{-1}\left(\frac{(M_x \cdot A_y - M_y \cdot A_x) \cdot \sqrt{A_x^2 + A_y^2 + A_z^2}}{-M_x \cdot A_x \cdot A_z - M_y \cdot A_y + M_z \cdot (A_x^2 + A_y^2)}\right)$$

$$Dip_0 = \cos^{-1}\left(\frac{A_x \cdot M_x + A_y \cdot M_y + A_z \cdot M_z}{\sqrt{A_x^2 + A_y^2 + A_z^2} \cdot \sqrt{M_x^2 + M_y^2 + M_z^2}}\right) - \frac{\pi}{2}$$

$$gTF_0 = \tan^{-1}\left(\frac{A_y}{A_x}\right)$$

$$mTF_0 = \tan^{-1}\left(\frac{M_y}{M_x}\right)$$

During of rotation of the excavating part, the phase correction amount calculating part 170 determines an offset between the gravity tool face and the magnetic force tool face based on the attitude determined by the attitude estimating part 110, and stores the determined offset as an estimated offset (TFO) into the memory 190 (S170). For example, during the rotation of the excavating part, the offset determined from most recently determined inclination angle (Inc), azimuth angle (Azm), and dip angle (Dip) may be updated as a new estimated offset (TFO). A specific calculation method, etc. will be described later. In step S101 shown in FIG. 7, the attitude estimating part 110 sets, as an estimated offset (TFO), an offset determined from a gravity tool face (gTF) and a magnetic force tool face (mTF) which are determined based on acceleration data ($A_x$, $A_y$, $A_z$) and magnetic field data ($M_x$, $M_y$, $M_z$) when the excavating part is stationary, and records the estimated offset (TFO) into the memory 190. Specifically, the gravity tool face (gTF), the magnetic force tool face (mTF), and the estimated offset (TFO) may be determined according to TFO=mTF−gTF.

The measuring apparatus 100 acquires acceleration data ($A_x$, $A_y$, $A_z$) output from the triaxial acceleration sensor 310 and magnetic field data ($M_x$, $M_y$, $M_z$) output from the triaxial magnetic sensor 320, the triaxial acceleration sensor 310 and the triaxial magnetic sensor 320 being arranged in the excavating part of the underground excavator (8300). The attitude estimating part 110 receives the acceleration data ($A_x$, $A_y$, $A_z$) and the magnetic field data ($M_x$, $M_y$, $M_z$) as input data, removes noise components by using a prior art such as a Kalman filter, and determines the inclination angle (Inc), the azimuth angle (Azm), the dip angle (Dip), the gravity tool face (gTF), and the magnetic force tool face (mTF) which represent the attitude of the excavating part of the underground excavator (S110). A prior art other than the Kalman filter may be used as long as it can remove the noise component. In a case where the Kalman filter is used, for example, the inclination angle (Inc), the azimuth angle (Azm), the dip angle (Dip), and the gravity tool face (gTF) may be contained in state quantities of the Kalman filter, acceleration data ($A_x$, $A_y$, $A_z$) and magnetic field data ($M_x$, $M_y$, $M_z$) may be used as input data for the Kalman filter, and the inclination angle (Inc), the azimuth angle (Azm), the dip angle (Dip), and the gravity tool face (gTF) which are the state quantities may be determined by using the Kalman filter. Other state quantities may be contained as the state quantities of the Kalman filter. For example, the rotation speed of the gravity tool face (gTF) may also be set as a state quantity. Here, ($a_x$, $a_y$, $a_z$) is defined as acceleration data ($a_x$, $a_y$, $a_z$) of a gravity component contained in the acceleration data ($A_x$, $A_y$, $A_z$). The relation among a measured gravity tool face (mgTF), a measured magnetic force tool face (mmTF), acceleration data ($a_x$, $a_y$, $a_z$), and magnetic field data ($M_x$, $M_y$, $M_z$) is as follows.

$$mgTF = \tan^{-1}\left(\frac{a_y}{a_x}\right)$$

$$mmTF = \tan^{-1}\left(\frac{M_y}{M_x}\right)$$

As described in <Analysis>, the phase of the magnetic force tool face changes due to the influence of an eddy current occurring in the metal housing during rotation, etc. Therefore, the difference between the offset between the measured gravity tool face (mgTF) and the measured magnetic force tool face (mmTF) and the estimated offset (TFO) is defined as a phase correction amount (pdm) as follows.

$$pdm=mmTF-mgTF-TFO$$

Note that the estimated offset (TFO) is data recorded in the memory 190. In other words, the estimated offset at a first time loop of the processing loop shown in FIG. 7 is an estimated offset (TFO) determined in step S101, and the estimated offset at a second and subsequent loops of the processing loop is an estimated offset (TFO) determined in step S170 of a just previous loop.

A corrected magnetic field data ($m_x$, $m_y$, $m_z$) obtained by correcting the magnetic field data ($M_x$, $M_y$, $M_z$) with a phase correction amount has the following relation:

$m_x=M_x \cos(pdm)-M_y \sin(pdm)$, $m_y=M_x \sin(pdm)+M_y \cos(pdm)$, and $m_z=M_z$ The magnetic force tool face (mTF) is affected by the rotation of the excavating part (the influence of an eddy current, phase delay of the magnetic sensor itself, etc.), but it is not easily affected by noise caused by other causes. Therefore, in step S110, the attitude estimating part 110 may determine the attitude by using the corrected magnetic field data ($m_x$, $m_y$, $m_z$) as indicated in the following formula:

$$mTF = \tan^{-1}\left(\frac{m_y}{m_x}\right)$$

The inclination angle (Inc), the azimuth angle (Azm), and the dip angle (Dip) have the following relation based on the acceleration data ($a_x$, $a_y$, $a_z$) and the corrected magnetic field data ($m_x$, $m_y$, $m_x$).

$$Inc = \cos^{-1}\left(\frac{a_z}{\sqrt{a_x^2 + a_y^2 + a_z^2}}\right)$$

$$Azm = \tan^{-1}\left(\frac{(m_x \cdot a_y - m_y \cdot a_x) \cdot \sqrt{a_x^2 + a_y^2 + a_z^2}}{-m_x \cdot a_x \cdot a_z - m_y \cdot a_y \cdot a_z + m_z \cdot (a_x^2 + a_y^2)}\right)$$

$$Dip = \cos^{-1}\left(\frac{a_x \cdot m_x + a_y \cdot m_y + a_z \cdot m_z}{\sqrt{a_x^2 + a_y^2 + a_z^2} \cdot \sqrt{m_x^2 + m_y^2 + m_z^2}}\right) - \frac{\pi}{2}$$

The phase correction amount calculating part 170 calculates an estimated offset TFO from the inclination angle (Inc), the azimuth angle (Azm), and the dip angle (Dip) determined by the attitude estimating part 110 according to the following formula:

$$TFO = \tan^{-1}\left(\frac{\cos(Dip) \cdot \sin(Azm)}{S}\right)$$

where S=cos(Dip)·cos(Inc)·cos(Azm)−sin(Dip)·sin(Inc) is satisfied, and the estimated offset TFO recorded in the memory 190 is updated (S170). Then, the processing returns to step S300. When the estimated offset (TFO) is updated in step S170, it is possible to follow the offset between the gravity tool face and the magnetic force tool face that has changed during rotation of the excavating part, so that the attitude can be accurately determined.

Experiment

Figure 8:
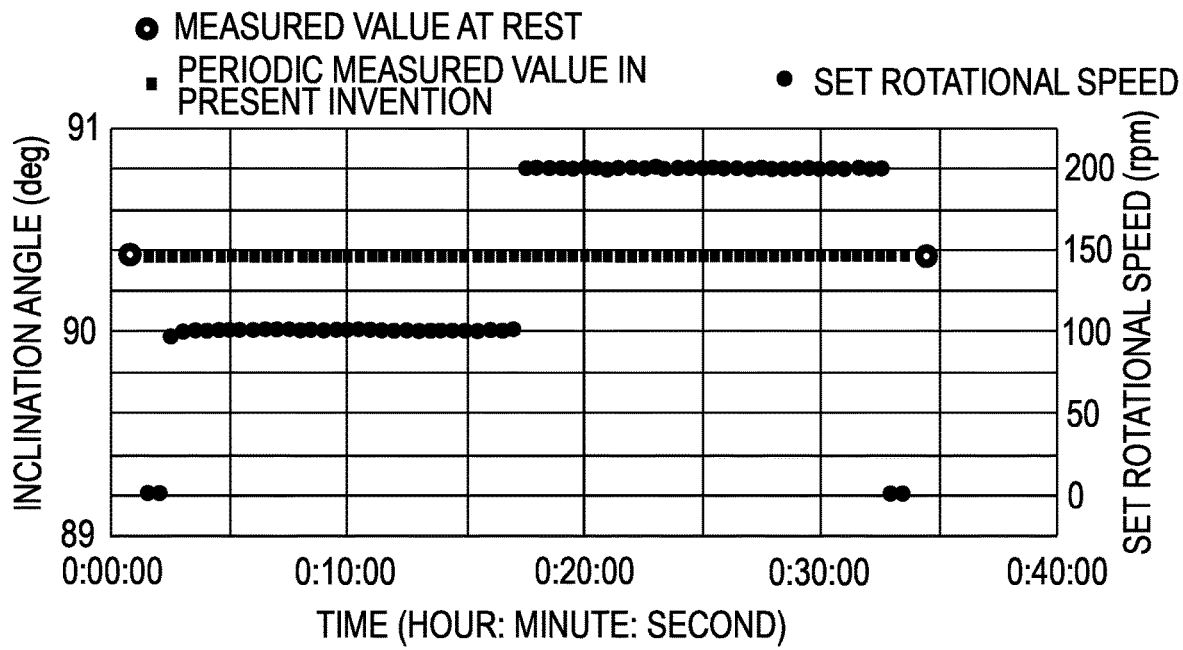
FIG. 8 is a diagram showing an inclination angle determined according to a measuring method of the present invention by using acceleration data and magnetic field data which are respectively output from a triaxial acceleration sensor and a triaxial magnetic sensor arranged in an excavating part having a metal housing in a state where the attitude of the excavating part is fixed while the rotational speed of the excavating part is controlled.
Figure 9:
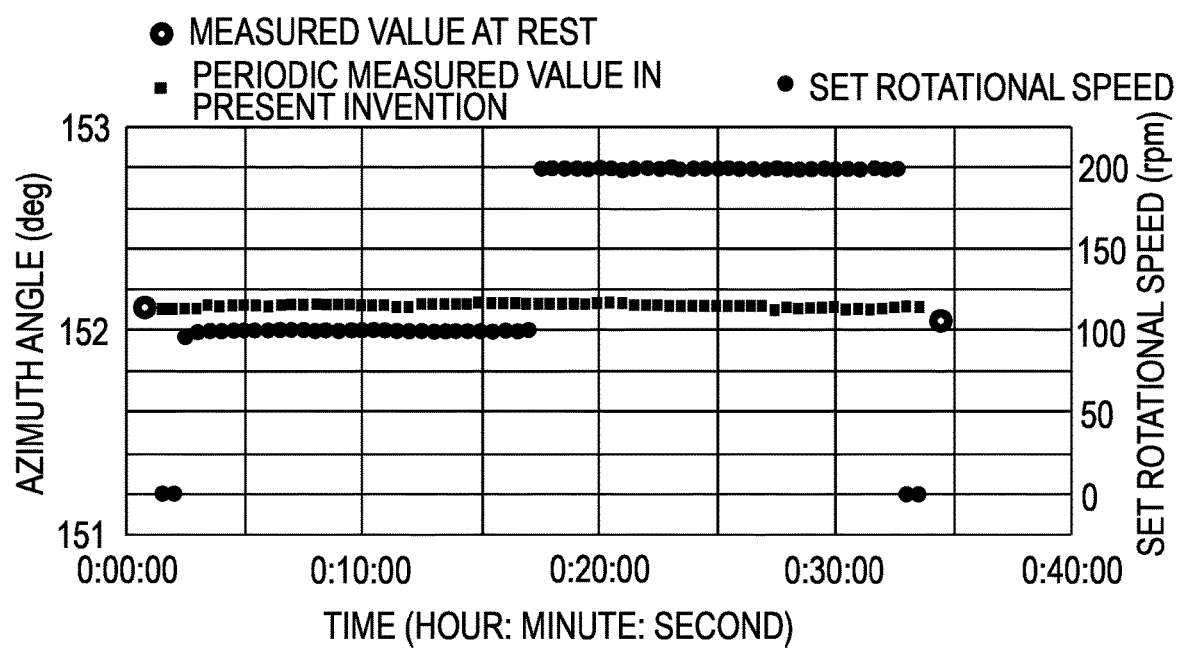
FIG. 9 is a diagram showing an azimuth angle determined according to the measuring method of the present invention by using the acceleration data and the magnetic field data which are respectively output from the triaxial acceleration sensor and the triaxial magnetic sensor arranged in the excavating part having the metal housing in a state where the attitude of the excavating part is fixed while the rotational speed of the excavating part is controlled.

FIGS. 8 and 9 show an inclination angle and an azimuth angle respectively, which are determined according the measuring method of the present invention including the step S170 described with respect to the embodiment by using acceleration data ($A_x$, $A_y$, $A_z$) and magnetic field data ($M_x$, $M_y$, $M_z$) are respectively output from the triaxial acceleration sensor and the triaxial magnetic sensor arranged in the housing of the excavating part in a state where the attitude of the excavating part is fixed while controlling the rotational speed of the excavating part having the metal housing. The vertical axis on the left side of FIG. 8 indicates the inclination angle (deg), and the vertical axis on the left side of FIG. 9 indicates the azimuth angle (deg). The vertical axes on the right side of FIGS. 8 and 9 indicates a set rotational speed (rpm) of the excavating part, and the horizontal axis thereof indicates a measurement time (hour: minute: second). Hollow circles indicate results (measured values at rest) obtained by using acceleration data ($A_x$, $A_y$, $A_z$) and magnetic field data ($M_x$, $M_y$, $M_z$) when the excavating part is stationary. Squares indicate results obtained periodically and continuously by using the acceleration data ($A_x$, $A_y$, $A_z$) and the magnetic field data ($M_x$, $M_y$, $M_z$). Note that the inclination angle and the azimuth angle are included in state quantities of the Kalman filter, and the inclination angle and the azimuth angle are determined by using the Kalman filter with the acceleration data ($A_x$, $A_y$, $A_z$) and the magnetic field data ($M_x$, $M_y$, $M_z$) being set as input data for the Kalman filter. From FIGS. 8 and 9, it is apparent that the inclination angle and the azimuth angle can be estimated without being affected by the metal housing even during rotation of the excavating part. Therefore, it is apparent that the influence of the eddy current occurring on the metal housing during rotation can be sufficiently reduced.

According to the measuring apparatus of the present invention, an influence caused by rotation of the excavating part can be reduced because a phase correction amount is calculated so as to cope with the change in phase of the magnetic field caused by the influence of an eddy current occurring in the metal housing covering the excavating part during excavation, the delay in phase of the magnetic sensor itself caused by the rotation of the excavating part, etc., and the attitude of the excavating part is determined by using the phase correction amount, so that the influence caused by the rotation of the excavating part can be reduced. Therefore, the attitude of the excavating part can be accurately measured even during excavation.

[Program, Recording Medium]

Figure 10:
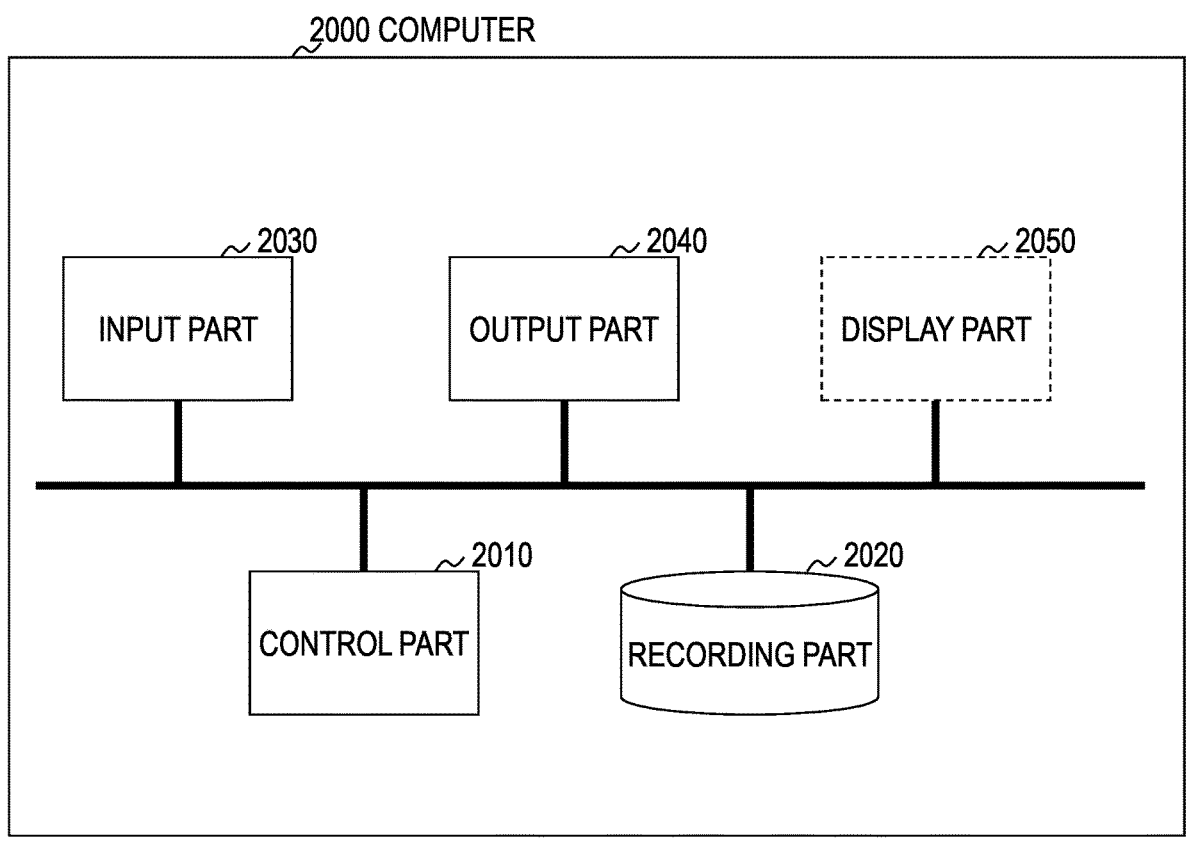
FIG. 10 is a diagram showing an example of a functional configuration of a computer.

The above-mentioned various processing can be executed by causing a recording part 2020 of a computer 2000 shown in FIG. 10 to read a program for executing each step of the above-mentioned method and causing a control part 2010, an input part 2030, an output part 2040, a display part 2050 and the like to operate.

The program in which this processing content is described can be recorded in a computer-readable recording medium. The computer-readable recording medium may include, for example, a magnetic recording device, an optical disk, a photomagnetic recording medium, a semiconductor memory, or the like.

Further, this program is distributed, for example, by selling, transferring, renting, or the like a portable recording medium such as DVD or CD-ROM on which the program is recorded. Further, this program may be distributed by storing the program in a storage device of a server computer, and then distributing the program by transferring the program from the server computer to another computer via a network.

A computer that executes such a program first causes, for example, a program recorded in a portable recording medium or a program transferred from a server computer to be temporarily stored into its own storage device. Then, when executing the processing, the computer reads the program stored in its own recording medium and executes the processing corresponding to the read-out program. Further, as another execution manner of this program, the computer may directly read the program from the portable recording medium and execute the processing corresponding to the program. Further, every time a program is successively transferred from a server computer to this computer, the computer may successively execute the processing corresponding to the received program. Still further, the above processing may be executed by a so-called ASP (Application Service Provider) type service for implementing processing functions only by execution of instructions and acquisition of results without transferring any program from the server computer to this computer. Note that the program in the embodiment is assumed to include information which is to be used for processing by a computer and equivalent to a program (data that is not a direct command to the computer, but has a property of defining the processing of the computer, etc.).

Further, in the present embodiment, the present device is configured by executing predetermined programs on the computer, but at least some of these processing contents may be implemented according to hardware.

What is claimed is:

1. A measuring apparatus for determining an attitude by using acceleration data output from an acceleration sensor having at least three axes and magnetic field data output from a magnetic sensor having at least three axes, the acceleration sensor and the magnetic sensor being arranged in an excavating part of an underground excavator, the measuring apparatus comprising:
   a processing circuitry which executes
      an attitude estimating processing for determining an attitude of the excavating part based on the acceleration data ($A_x$, $A_y$, $A_z$) and the magnetic field data ($M_x$, $M_y$, $M_z$); and
      a phase correction amount calculating processing for calculating an offset between a gravity tool face and a magnetic force tool face, and setting the calculated offset as an estimated offset, wherein
   in a state in which the excavating part is stationary,
      the attitude estimating processing sets, as an initial value of an estimated offset (TFO), an offset determined from a gravity tool face (gTF) and a magnetic force tool face (mTF) which are determined based on acceleration data ($A_x$, $A_y$, $A_z$) and magnetic field data ($M_x$, $M_y$, $M_z$), and records the estimated offset (TFO) into a memory; and
   during rotation of the excavating part, the measuring apparatus sequentially performs the following (1) to (6), and then repeats the sequence starting at (1):
      (1) the measuring apparatus acquires the acceleration data ($A_x$, $A_y$, $A_z$) and the magnetic field data ($M_x$, $M_y$, $M_z$),
      (2) the attitude estimating processing determines a measured gravity tool face (mgTF) from acceleration data ($a_x$, $a_y$, $a_z$) of a gravity component contained in the acceleration data ($A_x$, $A_y$, $A_z$) and a measured magnetic force tool face (mmTF) from magnetic field data ($M_x$, $M_y$, $M_z$),
      (3) the attitude estimating processing obtains a phase correction amount (pdm) as pdm=mmTF−mgTF−TFO and corrected magnetic field data ($m_x$, $m_y$, $m_z$) by correcting the magnetic field data ($M_x$, $M_y$, $M_z$) with the phase correction amount (pdm), (4) the attitude estimating processing determines the attitude based on the acceleration data ($a_x$, $a_y$, $a_z$) and the corrected magnetic field data ($m_x$, $m_y$, $m_z$), (5) the phase correction amount calculating processing calculates an estimated offset (TFO) from the attitude determined by the attitude estimating processing, and (6) the phase correction amount calculating processing updates the estimated offset (TFO) recorded in the memory.

2. The measuring apparatus according to claim 1, wherein the attitude determined by the attitude estimating processing includes an inclination angle, an azimuth angle, and a dip angle, and
the phase correction amount calculating processing updates the estimated offset with the offset between the gravity tool face and the magnetic force tool face calculated from the inclination angle, the azimuth angle and the dip angle determined by the attitude estimating processing during rotation of the excavating part.

3. The measuring apparatus according to claim 2, wherein an inclination angle Inc, an azimuth angle Azm and a dip angle Dip have a relation represented by:

$$Inc = \cos^{-1}\left(\frac{a_z}{\sqrt{a_x^2 + a_y^2 + a_z^2}}\right)$$

$$Azm = \tan^{-1}\left(\frac{(m_x \cdot a_y - m_y \cdot a_x) \cdot \sqrt{a_x^2 + a_y^2 + a_z^2}}{-m_x \cdot a_x \cdot a_z - m_y \cdot a_y \cdot a_z + m_z \cdot (a_x^2 + a_y^2)}\right)$$

$$Dip = \cos^{-1}\left(\frac{a_x \cdot m_x + a_y \cdot m_y + a_z \cdot m_z}{\sqrt{a_x^2 + a_y^2 + a_z^2} \cdot \sqrt{m_x^2 + m_y^2 + m_z^2}}\right) - \frac{\pi}{2}$$

where ($a_x$, $a_y$, $a_z$) represent gravity-caused acceleration data contained in the acceleration data, and ($m_x$, $m_y$, $m_z$) represent the corrected magnetic field data.

4. The measuring apparatus according to claim 3, wherein the phase correction amount calculating processing calculates an estimated offset TFO according to:

$$TFO = \tan^{-1}\left(\frac{\cos(Dip) \cdot \sin(Azm)}{S}\right)$$

where Inc represents an inclination angle determined by the attitude estimating processing, Azm represents an azimuth angle determined by the attitude estimating processing, Dip represents a dip angle determined by the attitude estimating processing, and $S=\cos(Dip)\cdot\cos(Inc)\cdot\cos(Azm)-\sin(Dip)\cdot\sin(Inc)$ is satisfied.

5. The measuring apparatus according to claim 3, wherein the magnetic field data and the corrected magnetic field data have the following relation:

$m_x = M_x \cos(pdm) - M_y \sin(pdm)$, $m_y = M_x \sin(pdm) + M_y \cos(pdm)$, and $m_z = M_z$, where pdm represents the phase correction amount, ($M_x$, $M_y$, $M_z$) represent the magnetic field data, and ($m_x$, $m_y$, $m_z$) represent the corrected magnetic field data.

6. The measuring apparatus according to claim 3, wherein the attitude estimating processing sets, as an initial value of the attitude, an attitude determined when the excavating part is stationary.

7. The measuring apparatus according to claim 2, wherein the phase correction amount calculating processing calculates an estimated offset TFO according to:

$$TFO = \tan^{-1}\left(\frac{\cos(Dip) \cdot \sin(Azm)}{S}\right)$$

where Inc represents an inclination angle determined by the attitude estimating processing, Azm represents an azimuth angle determined by the attitude estimating processing, Dip represents a dip angle determined by the attitude estimating processing, and $S=\cos(Dip)\cdot\cos(Inc)\cdot\cos(Azm)-\sin(Dip)\cdot\sin(Inc)$ is satisfied.

8. The measuring apparatus according to claim 2, wherein the magnetic field data and the corrected magnetic field data have the following relation:

$m_x = M_x \cos(pdm) - M_y \sin(pdm)$, $m_y = M_x \sin(pdm) + M_y \cos(pdm)$, and $m_z = M_z$, where pdm represents the phase correction amount, ($M_x$, $M_y$, $M_z$) represent the magnetic field data, and ($m_x$, $m_y$, $m_z$) represent the corrected magnetic field data.

9. The measuring apparatus according to claim 2, wherein the attitude estimating processing sets, as an initial value of the attitude, an attitude determined when the excavating part is stationary.

10. The measuring apparatus according to claim 1, wherein the magnetic field data and the corrected magnetic field data have the following relation:

$m_x = M_x \cos(pdm) - M_y \sin(pdm)$, $m_y = M_x \sin(pdm) + M_y \cos(pdm)$, and $m_z = M_z$, where pdm represents the phase correction amount, ($M_x$, $M_y$, $M_z$) represent the magnetic field data, and ($m_x$, $m_y$, $m_z$) represent the corrected magnetic field data.

11. The measuring apparatus according to claim 1, wherein the attitude estimating processing sets, as an initial value of the attitude, an attitude determined when the excavating part is stationary.

12. A measuring method using acceleration data output from an acceleration sensor having at least three axes and magnetic field data output from a magnetic sensor having at least three axes, the acceleration sensor and the magnetic sensor being arranged in an excavating part of an underground excavator, the measuring method executing:
attitude estimating for determining an attitude of the excavating part based on the acceleration data ($A_x$, $A_y$, $A_z$) and the magnetic field data ($M_x$, $M_y$, $M_z$); and
a phase correction for calculating an offset between a gravity tool face and a magnetic force tool face, and setting the calculated offset as an estimated offset, wherein
in a state in which the excavating part is stationary,
the attitude estimating sets, as an initial value of an estimated offset (TFO), an offset determined from a gravity tool face (gTF) and a magnetic force tool face (mTF) which are determined based on acceleration data ($A_x$, $A_y$, $A_z$) and magnetic field data ($M_x$, $M_y$, $M_z$), and records the estimated offset (TFO) into a memory; and during rotation of the excavating part, the measuring method repeats sequentially performs the following (1) to (6), and then repeats the sequence starting at (1):
(1) the measuring method acquires the acceleration data ($A_x$, $A_y$, $A_z$) and the magnetic field data ($M_x$, $M_y$, $M_z$),
(2) the attitude estimating determines a measured gravity tool face (mgTF) from acceleration data ($a_x$, $a_y$, $a_z$) of a gravity component contained in the acceleration data ($A_x$, $A_y$, $A_z$) and a measured magnetic force tool face (mmTF) from magnetic field data ($M_x$, $M_y$, $M_z$),
(3) the attitude estimating obtains a phase correction amount (pdm) as pdm=mmTF−mgTF−TFO and corrected magnetic field data ($m_x$, $m_y$, $m_z$) by correcting the magnetic field data ($M_x$, $M_y$, $M_z$) with the phase correction amount (pdm),
(4) the attitude estimating determines the attitude based on the acceleration data ($a_x$, $a_y$, $a_z$) and the corrected magnetic field data ($m_x$, $m_y$, $m_z$),
(5) the phase correction calculates an estimated offset (TFO) from the attitude determined by the attitude estimating processing, and
(6) the phase correction updates the estimated offset (TFO) recorded in the memory.

13. The measuring method according to claim 12, wherein the attitude determined in the attitude estimating includes an inclination angle, an azimuth angle, and a dip angle, and
the phase correction updates the estimated offset with the offset between the gravity tool face and the magnetic force tool face calculated from the inclination angle, the azimuth angle and the dip angle determined in the attitude estimating during rotation of the excavating part.

14. The measuring method according to claim 13, wherein an inclination angle Inc, an azimuth angle Azm and a dip angle Dip have a relation represented by:

$$Inc = \cos^{-1}\left(\frac{a_z}{\sqrt{a_x^2+a_y^2+a_z^2}}\right)$$

$$Azm = \tan^{-1}\left(\frac{(m_x \cdot a_y - m_y \cdot a_x) \cdot \sqrt{a_x^2+a_y^2+a_z^2}}{-m_x \cdot a_x \cdot a_z - m_y \cdot a_y \cdot a_z + m_z \cdot (a_x^2+a_y^2)}\right)$$

$$Dip = \cos^{-1}\left(\frac{a_x \cdot m_x + a_y \cdot m_y + a_z \cdot m_z}{\sqrt{a_x^2+a_y^2+a_z^2} \cdot \sqrt{m_x^2+m_y^2+m_z^2}}\right) - \frac{\pi}{2}$$

where ($a_x$, $a_y$, $a_z$) represent gravity-caused acceleration data contained in the acceleration data, and ($m_x$, $m_y$, $m_z$) represent the corrected magnetic field data.

15. The measuring method according to claim 14, wherein the phase correction calculates an estimated offset TFO according to:

$$TFO = \tan^{-1}\left(\frac{\cos(\text{Dip}) \cdot \sin(Azm)}{S}\right)$$

where Inc represents an inclination angle determined in the attitude estimating, Azm represents an azimuth angle determined in the attitude estimating, Dip represents a dip angle determined in the attitude estimating, and S=cos(Dip)·cos(Inc)·cos(Azm)−sin(Dip)·sin(Inc) is satisfied.

16. The measuring method according to claim 13, wherein the phase correction calculates an estimated offset TFO according to:

$$TFO = \tan^{-1}\left(\frac{\cos(\text{Dip}) \cdot \sin(Azm)}{S}\right)$$

where Inc represents an inclination angle determined in the attitude estimating, Azm represents an azimuth angle determined in the attitude estimating, Dip represents a dip angle determined in the attitude estimating, and S=cos(Dip)·cos(Inc)·cos(Azm)−sin(Dip)·sin(Inc) is satisfied.

17. The measuring method according to claim 12, wherein the magnetic field data and the corrected magnetic field data have the following relation:

$m_x = M_x \cos(pdm) - M_y \sin(pdm)$, $m_y = M_x \sin(pdm) + M_y \cos(pdm)$, and $m_z = M_z$, where pdm represents the phase correction amount, ($M_x$, $M_y$, $M_z$) represent the magnetic field data, and ($m_x$, $m_y$, $m_z$) represent the corrected magnetic field data.

18. The measuring method according to claim 12, wherein the attitude estimating sets, as an initial value of the attitude, an attitude determined in a state in which the excavating part is stationary.

19. A non-transitory computer-readable recording medium having a program stored therein, the program causing a computer to perform:
a measuring using acceleration data output from an acceleration sensor having at least three axes and magnetic field data output from a magnetic sensor having at least three axes, the acceleration sensor and the magnetic sensor being arranged in an excavating part of an underground excavator, the measuring including:
an attitude estimating for determining an attitude of the excavating part based on the acceleration data ($A_x$, $A_y$, $A_z$) and the magnetic field data ($M_x$, $M_y$, $M_z$); and
a phase correction for calculating an offset between a gravity tool face and a magnetic force tool face, and setting the calculated offset as an estimated offset, wherein
in a state in which the excavating part is stationary,
the attitude estimating sets, as an initial value of an estimated offset (TFO), an offset determined from a gravity tool face (gTF) and a magnetic force tool face (mTF) which are determined based on acceleration data ($A_x$, $A_y$, $A_z$) and magnetic field data ($M_x$, $M_y$, $M_z$), and records the estimated offset (TFO) into a memory; and
during rotation of the excavating part, the measuring repeats sequentially performs the following (1) to (6), and then repeats the sequence starting at (1):
(1) the measuring acquires the acceleration data ($A_x$, $A_y$, $A_z$) and the magnetic field data ($M_x$, $M_y$, $M_z$),
(2) the attitude estimating determines a measured gravity tool face (mgTF) from acceleration data ($a_x$, $a_y$, $a_z$) of a gravity component contained in the acceleration data ($A_x$, $A_y$, $A_z$) and a measured magnetic force tool face (mmTF) from magnetic field data ($M_x$, $M_y$, $M_z$),
(3) the attitude estimating obtains a phase correction amount (pdm) as pdm=mmTF−mgTF−TFO and corrected magnetic field data ($m_x$, $m_y$, $m_z$) by correcting the magnetic field data ($M_x$, $M_y$, $M_z$) with the phase correction amount (pdm), (4) the attitude estimating determines the attitude based on the acceleration data ($a_x$, $a_y$, $a_z$) and the corrected magnetic field data ($m_x$, $m_y$, $m_z$), (5) the phase correction calculates an estimated offset (TFO) from the attitude determined by the attitude estimating processing, and (6) the phase correction updates the estimated offset (TFO) recorded in the memory.

20. The non-transitory computer-readable recording medium according to claim 19, wherein the attitude determined in the attitude estimating includes an inclination angle, an azimuth angle, and a dip angle, and the phase correction updates the estimated offset with the offset between the gravity tool face and the magnetic force tool face calculated from the inclination angle, the azimuth angle and the dip angle determined in the attitude estimating during rotation of the excavating part.

21. The non-transitory computer-readable recording medium according to claim 20, wherein the phase correction calculates an estimated offset TFO according to:

$$TFO = \tan^{-1}(\cos(Dip) \cdot \sin(Azm)/S)$$

where Inc represents an inclination angle determined in the attitude estimating, Azm represents an azimuth angle determined in the attitude estimating, Dip represents a dip angle determined in the attitude estimating, and $S = \cos(Dip) \cdot \cos(Inc) \cdot \cos(Azm) - \sin(Dip) \cdot \sin(Inc)$ is satisfied.

* * * * *